United States Patent [19]

Sefcik

[11] 4,180,152
[45] Dec. 25, 1979

[54] LOAD BEARING PENDANT SYSTEM

[76] Inventor: Robert Sefcik, 3 Briar La., Cherry Hill, N.J. 08002

[21] Appl. No.: 880,200

[22] Filed: Feb. 22, 1978

[51] Int. Cl.² .................... B65G 17/32; B65G 37/00
[52] U.S. Cl. ............................... 198/377; 198/477; 198/344
[58] Field of Search ............ 198/377, 680, 477, 344; 118/322

[56] References Cited

U.S. PATENT DOCUMENTS

| 2,471,347 | 5/1949 | Rayburn | 198/680 |
| 3,171,536 | 3/1965 | Johnson | 198/680 |
| 3,684,078 | 8/1972 | Nielsen | 198/377 |
| 3,944,058 | 3/1976 | Strauss | 198/344 |

Primary Examiner—Robert B. Reeves
Assistant Examiner—Brian M. Bond
Attorney, Agent, or Firm—Maleson, Rosenberg & Bilker

[57] ABSTRACT

A load bearing pendant system of the type commonly used in conjunction with an overhead conveyor system. The disclosed pendant system is adjustable to operate in either of two distinct modes. A first mode of operation provides for continuous rotation of a work piece being linearly displaced along a conveyor line. A second mode of operation provides for indexed rotation at various predetermined spacial intervals along the line. Conversion from operation in either mode to the other is accomplished by threaded securement or removal, thereby avoiding the otherwise necessary capital investment in two separate sets of pendant systems directed to each mode. The load bearing pendant system includes a hanger assembly upon which objects are releasably mounted. The hanger assembly is linearly driven in a predetermined direction along the conveyor system. A hanger drive mechanism which is connected to both the hanger assembly and the conveyor system either rotates or provides for indexing of the hanger assembly.

10 Claims, 5 Drawing Figures

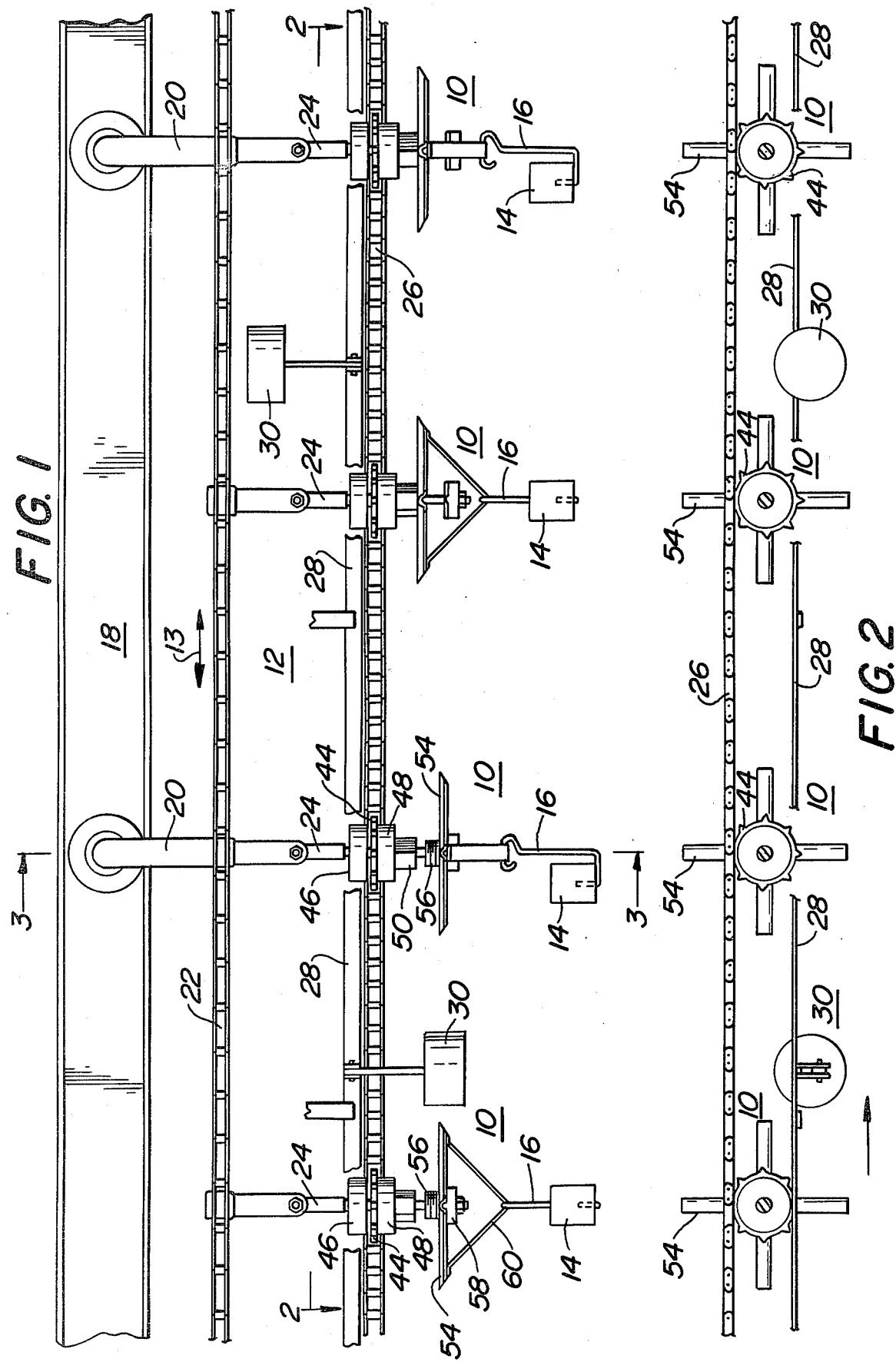

4,180,152

LOAD BEARING PENDANT SYSTEM

BACKGROUND OF THE INVENTION

1. Field of the Invention

This invention relates in general to load bearing pendant systems and specifically to pendants used in conjunction with overhead conveyor systems for displacing an article or work piece in a manufacturing or processing plant. More specifically, this invention relates to the movement of articles successively through a series of positions in which different operations are performed thereon, such as cleaning, spray painting, hand painting, baking, or the like while the work piece is rotating or during the times between such rotations.

2. Prior Art

Specifically, during spraying and coating operations, it has often been found necessary to rotate a work piece continuously while applying spray to it as it is moved by an overhead conveyor. At other times, the spraying or coating operation has required that the work piece remain at a particular angular orientation for a fixed time interval while it travels between two points on a conveyor line. Subsequent to this time interval the object is rotated to a second angular orientation while traveling between other points on the line.

Due to the fact that it is sometimes necessary to continuously rotate the work piece, and at other times to index the rotation in discrete increments, the industry has over the years developed two different types of pendant systems for use with overhead conveyors. The first such type of pendant is specifically designed for continuously rotating a work piece and is usually rotatably mounted to the conveyor. It is customary to provide a fixed stationary length of chain parallel to the conveyor situated between the conveyor and the work piece. This chain engages a sprocket on this type of pendant system and as the conveyor carries the pendant and work piece past the stationary chain, the pendant is continuously rotated by the inter-action of its sprocket teeth with the stationary chain.

For manufacturing or processing operations requiring indexed rotation, a second type of pendant system has been developed. These indexing type pendants do not have sprockets to continuously engage a stationary chain. Rather, they have been designed to remain in fixed position at various angular orientations. A cam is hung in the vacinity of the pendant at each indexing point and as the pendant passes the indexing point and engages the cam, it is forced to rotate to its next angular orientation.

Particular spraying or processing operations require a great many hangers, and when operations are carried out that require both continuous rotation and index rotation at various times in the operation, it becomes necessary to stock a full complement of both types of pendant systems. Such a requirement leads to increased capital costs. In addition, when changing from one type of pendant to another, considerable time and money is lost during the required down time.

SUMMARY OF THE INVENTION

A load bearing pendant system which includes a displacement mechanism for moving the pendant system in a linear direction substantially perpendicular to a vertically directed axis line. A hanger assembly is connected to the displacement mechanism and is adapted to releaseably capture objects mounted thereon. A hanger drive mechanism is coupled to the displacement mechanism and the hanger assembly for either rotatively displacing the hanger assembly about the vertical axis line or maintaining the hanger assembly in independent displacement with respect to the hanger drive mechanism.

It is therefore an object of the present invention to provide a load bearing pendant for use with an overhead conveyor system.

Another object of the present invention is to provide a load bearing pendant suitable for use in both a continuous rotation mode and an indexed rotation mode.

Still another object of the present invention is to provide a load bearing pendant that can be quickly and easily converted back and forth from use as a continuous rotation pendant to one used for indexed rotation.

BRIEF DESCRIPTION OF THE DRAWINGS

Other objects and many of the attendant advantages of the present invention will readily become apparent as the invention becomes better understood by reference to the following detailed description, with the appended claims, when considered in conjunction with the accompanying drawings wherein:

FIG. 1 is a side view of the convertible mode pendant in use with its overhead conveyor system;

FIG. 2 is a top view of the convertible mode pendant in use with its overhead conveyor system;

DESCRIPTION OF THE PREFERRED EMBODIMENTS

Figure 3:
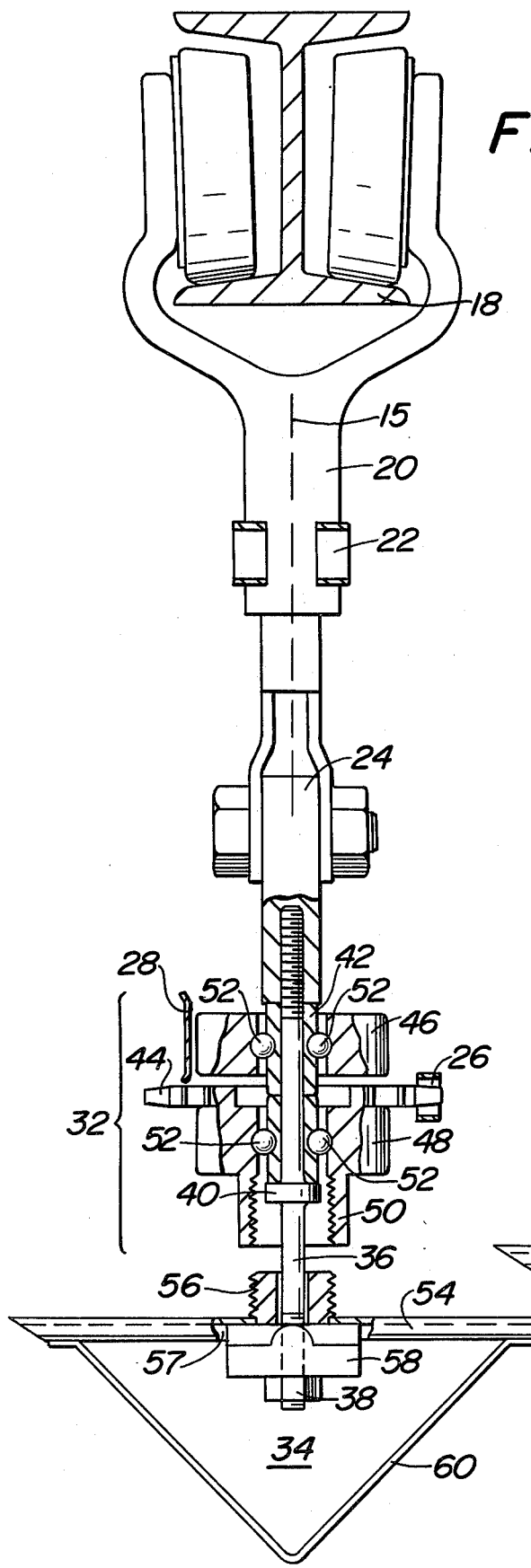
FIG. 3 is a cut-away side view of the convertible mode pendant set for operation in its indexing mode.

Referring now to FIGS. 1 and 2 there is shown load bearing pendant system or convertible mode pendant 10 according to the present invention. In general, system 10 is used in conjunction with overhead conveyor or displacement system 12. A section of conveyor or displacement system 12 is shown with four pendants 10 depending therefrom in various states of rotational alignment. In overall concept, conveyor 12 details a displacement mechanism for displacing load bearing pendant system 10 in a linear direction defined by directional arrow 13. Linear displacement of system 10 is in a direction generally normal to a vertically directed axis line 15 of system 10, shown clearly in FIGS. 3 and 4.

Overhead conveyor system 12 with which pendant system 10 is designed to cooperate, includes stationary or immoveable track 18 in combination with a plurality of trollies 20 supporting moving chain 22. Each pendant system 10 is suspended from moving chain 22 via support rod 24, and is shown holding work piece 14 on a hook 16.

As will be seen in following paragraph, system 10 further includes stationary chain 26 positioned below moving chain 22 in order that predetermined elements of system 10 interface therewith. Stationary guide rail 28 is positionally located parallel to stationary chain 26 and on the opposite side of pendant system 10 when taken with respect to stationary chain 26. Guide rail 28 forces pendant 10 into continuous contact with chain 26, and in addition, serves as a supporting structure for a series of cams 30. As can be seen in FIG. 1, cams 30 are suspended from guide rail 28 in the path of pendant 10. As will be described in the following paragraphs, cams 30 are used when pendants are operating in an indexing mode. Cams 30 are mounted in pivoted fashion, in order that they may be swung into or out of the path of pendant 10 as desired.

Figure 5:
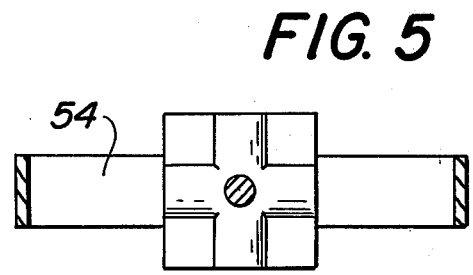
FIG. 5 is a sectional view taken along the line shown in FIG. 4 and detailing the indexing arms of the pendant.
Figure 4:
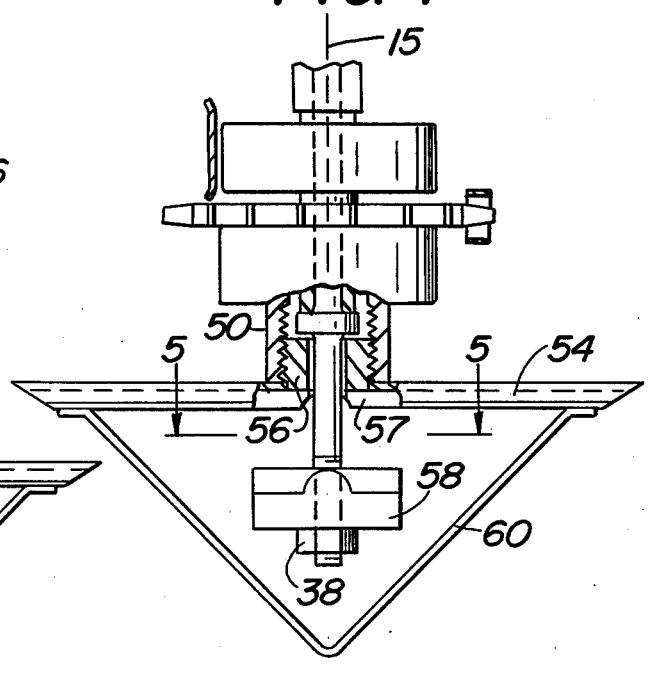
FIG. 4 is a cut-away side view of the convertible mode pendant set for use in its continuous rotational mode.

Pendant system 10 according to the present invention, is illustrated in detail in FIGS. 3, 4 and 5. Referring specifically to FIG. 3, pendant system 10 includes two main assemblies: sprocket assembly or hanger drive mechanism 32 and hanger assembly 34. Hanger assembly 34 is coupled to displacement mechanism 12 and as is seen is adapted to releaseably capture objects 14 mounted on hook members 16. Hnager drive mechanism or sprocket assembly 32 is coupled to displacement mechanism 12 and hanger assembly 34 for (1) rotatively displacing hanger assembly 34 about axis line 15 when hanger drive mechanism 32 is engaged to hanger assembly 34 and, (2) maintaining hanger assembly 34 in independent displacement with respect to hanger drive mechanism 32 when such is disengaged from hanger assembly 34. Spindle 36 acts as a shaft around which the entire pendant or parts thereof may rotate, and which serves as a convenient means to coupled pendant 10 to support rod 24 of trollies 20. Spindle 36, having nut member 38 threaded to a lower end, passes through hanger assembly 34, through sprocket assembly 32, and threadedly engages support rod 24. Flanged portion 40 of spindle 36 between its upper and lower ends engages sprocket assembly or hanger drive mechanism 32 such that sprocket assembly 32 seats on flanged portion 40 and is supported thereon. Thus, sprocket assembly 32 is rotatably displaceable about shaft or spindle 36.

Hanger assembly 34 is independently suspended about spindle or shaft 36 by the action of nut 38 threaded onto a lower end. Flange portion 40 of sprocket assembly 32 and nut 38 of hanger assembly 34 allow assemblies 32 and 34 to be independently supported around spindle 36 in order that they may freely turn independently of one another as long as they are not otherwise connected.

Sprocket assembly 32 includes stationary chain 26 to force pendant system 10 to rotate as it is conveyed along tack 18. Sprocket assembly 32 includes a weldment built around stationary central core 42 through which spindle 36 with its flanged portion 40 passes and engages. All other elements of sprocket assembly 32 surround and are symmetric with central core 42.

Sprocket assembly or hanger drive mechanism 32 includes hanger drive gear member or sprocket 44. Stationary chain member 26 is coupled or interfaces with gear member 44 for rotative displacement of hanger drive gear member 44 responsive to the linear displacement of load bearing pendant system 10.

Upper wheel or pulley 46 is mounted around central core 42 of sprocket 44 with a relatively small gap separating the bottom of the upper wheel from sprocket 44.

Hanger housing member 48 is mounted around central core 42 immediately below sprocket 44 and is welded thereto, thereby forcing lower wheel or housing member 48 to turn with sprocket 44. Housing member 48 includes sprocket assembly bushing 50 that is internally threaded and forms a lower portion of housing member 48.

Assembly housing 50 is engaged by bushing 56 positioned at the top of hanger assembly 34 when pendant 10 is being operated in a continuous rotation mode of operation. In this mode hanger assembly 34 is forced to rotate through firm connection with sprocket assembly 32. Ball bearings 52 separate both upper wheel 46 and housing 48 from central core 42 and allows sprocket assembly 32 to rotate continuously when in motion and engaging stationary chain 26.

In operation, the displacement of pendant 10 along conveyor track 18 causes sprocket 44 to engage and be turned by stationary chain 26, imparting rotation to sprocket assembly 32 which rotatively displaces about spindle 36 on ball bearings 52.

Hanger assembly 34, like sprocket assembly 32, is concentric with spindle 36, acting as a shaft for the pendant system 10. Four indexing arms 54 protrude radially from a hanger mount 57. Mounted directly above and concentric with hanger mount 57 is externally threaded bushing 56, the threads of which mate with the internal threads of sprocket assembly bushing 50.

Indexing arms 54, which are more clearly visible in FIG. 2, and FIG. 5, are shown spaced at 90° intervals around hanger mount 57. The particular spacing is not critical to the inventive concept, and is shown as 90° due to the fact that such is the most often using indexing scheme in manufacturing and processing applications. Longitudinal grooves are cut into indexing arms 54 to assist with indexing as will be further explained below.

Referring again to FIGS. 3 and 4, disk shaped indexing plate 58 having a hollow core seats upon and rests on spindle nut 38. The upper side of indexing plate 58 is machined to concave, protruding upward toward the underside of hanger mount 57. The underside of hanger mount 57 is machined convex to mate with the upper surface of indexing plate 58 when pendant 10 is operating in the indexing mode. Hanger 60 is suspended from indexing arms 54 and serves as the support for hook 16 holding work piece 14 (not shown in FIGS. 3-5, but visible in FIG. 1).

The inside of hanger assembly bushing 56 is of slightly greater diameter than that of spindle 36 passing as a shaft through it. Thus, the entire hanger assembly 34 will rest loosely on top of spindle nut 38 when hanger assembly bushing 56 is not threaded into sprocket assembly bushing 50.

Pendant 10, as described, is capable of being operated in either a continuous rotation mode or in an indexed rotational mode. Continuous rotation can be achieved by threading hanger assembly bushing 56 into sprocket assembly bushing 50. Once these two assemblies are securely mated, indexing plate 58 will rest on top of spindle nut 38 as shown in FIG. 4. The underside of hanger mount 57 will not engage indexing plate 58, and the hanger assembly 34 will freely rotate with sprocket assembly 32 as sprocket 44 engages and is rotated by stationary chain 26.

To convert to the index rotational mode, it is only necessary to unscrew hanger assembly bushing 56 and hence the entire hanger assembly 34 from sprocket assembly bushing 50 until the entire hanger assembly drops onto indexing plate 58 as shown in FIG. 3. Hanger assembly 34 is then supported by spindle nut 38 and the top of indexing plate 58 will be in contact with the underside of hanger mount 57. Hanger assembly 34 will no longer be engaged with sprocket assembly 32 and will not rotate with the sprocket assembly. Cams 30 are pivoted down at appropriate intervals in order that indexing arms 54 will engage them and be forced to rotate. Indexing arms 54 have longitudinal grooves cut in them which raise on raised detents on the top of hanger mount 57 in order that there has to be a positive force to move them out of position and they tend to drop into the next groove after rotation. These grooves prevent undesired rotation when indexing arms 54 are not in contact with cams 30.

There has therefore been provided a convertible mode pendant for use in conjunction with an overhead conveyor system, having many advantages and new features. The use of convertible mode pendant 10 according to the present invention allows the user to stock one type of pendant for both continuous rotational use and indexed rotational use. It is no longer required to stock two separate types of pendants for use in manufacturing or processing applications. In addition, conversion from one mode to the other is easily accomplished by simple threaded adjustment, thereby eliminating costly down time. Various minor alterations to pendant 10 as disclosed can naturally be made without affecting the spirit of the invention. For example, stationary chain 26 could be replaced by a gear rack, a belt, or any similar band providing traction. In such embodiments sprocket wheel 44 would be adapted to engage whatever traction means were provided.

An example of another obvious modification within the spirit of the invention is in the means of providing a selectively detachable connection between bushing 56 and assembly bushing 50. Instead of the threaded connection shown and described, it is possible to use other known equivalent structures. For example, it is known that screw thread connections may be replaced with bayonet or camming connections. The scope and spirit of this invention are intended to include such equivalents of the screw thread connection.

Obviously, other embodiments and modifications of the present invention will readily come to those of ordinary skill in the art, having the benefit of the teachings presented in the foregoing description and the drawings. It is therefore to be understood that this invention is not to be limited thereto, and that said modifications and embodiments are intended to be included within the scope of the appended claims.

What is claimed is:

1. A load bearing pendant system comprising:
   (a) means for displacing said load bearing pendant system in a linear direction substantially normal to a vertically directed axis line;
   (b) a hanger assembly threadedly coupled to said displacement means adapted to releaseably capture objects mounted thereon; and,
   (c) hanger drive means rotatively coupled to said displacement means and threadedly engageable with said hanger assembly for (1) rotatively displacing said hanger assembly about said vertically directed axis line when said hanger drive means is threadedly engaged to said hanger assembly, and (2) permitting said hanger assembly independent rotational displacement with respect to said hanger drive means when said hanger drive means is threadedly disengaged from said hanger assembly.

2. The load bearing pendant sysem as recited in claim 1 where said hanger drive means includes:
   (a) a hanger drive gear member;
   (b) a chain member coupled to said hanger drive gear member for rotative displacement of said drive gear member responsive to said linear displacement of said load bearing pendant system; and,
   (c) a hanger housing member secured to said drive gear member for rotative displacement of said hanger housing member responsive to said drive gear member rotation.

3. The load bearing pendant system as recited in claim 2 including a hanger assembly shaft member fixedly secured to said displacement means, said hanger assembly and said hanger drive means being rotatably displaceable with respect to said hanger assembly shaft member.

4. The load bearing pendant system as recited in claim 3 where said hanger assembly shaft member extends substantially coincident with said vertically directed axis line, said shaft member extending through said hanger drive means.

5. The load bearing pendant system as recited in claim 4 including at least a pair of roller bearing members positionally located between said shaft member and said hanger housing member internal thereto.

6. The load bearing pendant system as recited in claim 5 including means for fixedly securing said hanger assembly to said hanger housing member for rotative displacement of said hanger assembly responsive to a corresponding rotation of said hanger housing member.

7. The load bearing pendant system as recited in claim 6 where said fixed securement means includes threaded securement means formed in said hanger housing member and on said hanger assembly for coupling each to the other.

8. The load bearing pendant system as recited in claim 7 where said hanger assembly is slideable in said vertical direction on said hanger assembly shaft member for providing coupling and discoupling of said hanger assembly to said hanger housing member.

9. The load bearing pendant system as recited in claim 8 where said hanger assembly includes at least one indexing arm member extending in substantially a radial direction with respect to said hanger assembly shaft member.

10. The load bearing pendant system as recited in claim 9 including can means external said hanger assembly for intersecting the path of said indexing arm member when said hanger assembly is independently displaceable with respect to said hanger drive means.

* * * * *